March 4, 1958 H. HARRISON 2,825,297
SHOCK REGISTERING DEVICE
Filed May 27, 1955
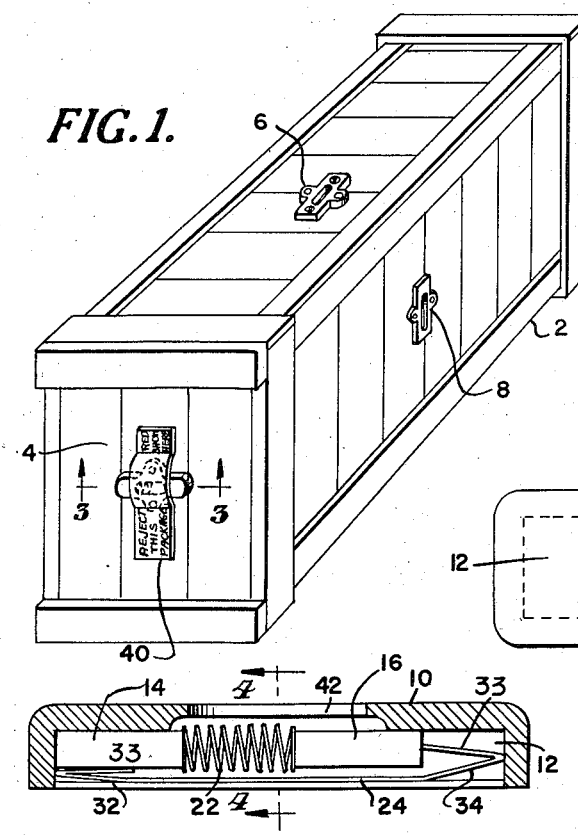
FIG.1.
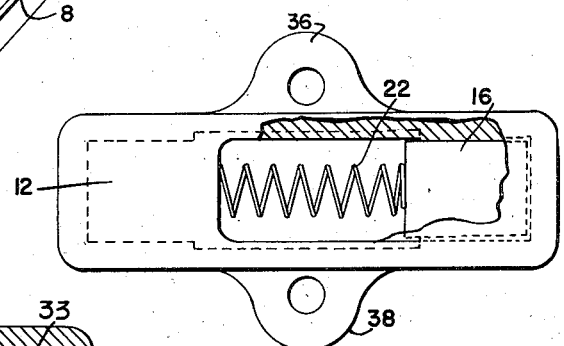
FIG.2.
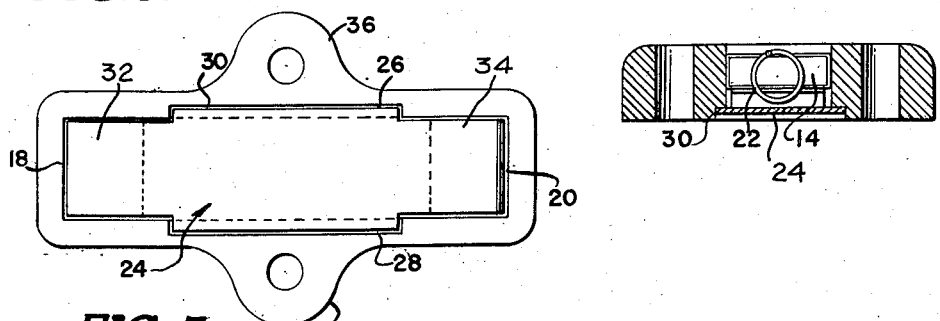
FIG.3.
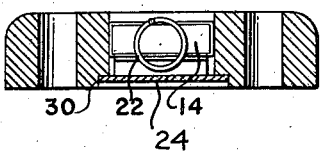
FIG.4.
FIG.5
INVENTOR
HENRY HARRISON
BY Cushman, Darby & Cushman
ATTORNEYS

2,825,297
SHOCK REGISTERING DEVICE

Henry Harrison, Port Washington, N. Y.

Application May 27, 1955, Serial No. 511,652

5 Claims. (Cl. 116—114)

The present invention relates to a shock registering device.

It is an object of the present invention to provide a device for measuring when a package has been subjected to too great a shock in handling.

It is a further object to prepare such a device which is tamperproof.

It is an additional object to prepare such a device which can be readily attached to the outside of a package.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The shock registering device of the present invention is a type of irreversible accelerometer which measures the violence of the shocks experienced by a package or other object to which it is attached. When, for example due to rough handling, the shock exceeds in violence a previously determined safe limit, the device of the present invention displays a visible, tamperproof indication that the limit has been exceeded. The shock registering device is suitable for mounting outside on the surface of a package and thus can be used as a means for fixing responsibility for damage to fragile shipments. Consequently, it acts as a deterrent to unnecessary roughness in handling.

In the drawing:

Figure 1 shows a package with several shock registering devices of the present invention attached thereto.

Figure 2 is a top view of the device, partially broken away and in section.

Figure 3 is a longitudinal section of the device taken along the lines 3—3 in Figure 1.

Figure 4 is a section taken along the lines 4—4 in Figure 3.

Figure 5 is a bottom view.

Referring to the drawings which show a preferred form of the shock registering device of the present invention, there are attached to a box 2 shock registering devices 4, 6 and 8. As the device is sensitive to shock along one axis only, several of the devices may be used together, as shown in Figure 1, to register shocks along any one of several axes.

The shock registering device 6 can be housed in a housing 10, preferably made of a transparent plastic, such as polystyrene, polymethyl methacrylate or polyethylene. It is not necessary to make the entire housing of transparent material; only the portion 42 of the top of the housing which shows when either of the weights 14 and 16 has moved into an excessive shock-indicating position need be made transparent. Within the housing is a rectangular cavity 12. Two square weights 14 and 16 of steel, brass, lead or other heavy metal fit slidably into this rectangular cavity. While square weights are preferred, it will be evident to those skilled in the art that other rectangular weights or metal balls, or even weights which are elliptical or of other shape, can be employed. The weights are pushed against the ends 18 and 20 of the cavity by a small helical compression spring 22 between them. In other words, the weights are biased or urged in opposite directions by the spring. In place of the helical compression spring, there can be employed other resilient means, although the use of a compression spring is preferred.

The weights 14 and 16 and the spring 22 are held into the cavity by a cover 24, preferably made of thin sheet steel, which is wedged between the two sides 26 and 28 of the cavity and forced in against the bottom of a shallow recess 30. The ends 32 and 34 of the cover are folded back on themselves to provide a pair of spring catches or pawls 33 and are normally positioned under the weights 14 and 16.

When a package or other body to which the present device is rigidly attached comes to a sudden stop, one of the weights, being restrained only by the spring 22, will tend to continue moving, thereby compressing the spring. If the shock is sufficiently violent, the displaced weight will go past the doubled back end of the cover and the latter will act as a spring catch and thus prevent the weight from returning to its initial position and permit it to remain in a position indicating excessive shock. In Figure 3, there is illustrated the effect of a shock sufficiently violent to displace weight 16 beyond the doubled back end 34 of the cover 24. It will be noted that doubled back end 34 acts in the manner indicated to prevent weight 16 from returning to its initial position.

The force of the helical spring determines the minimum acceleration at which the weights will be stirred. For any given spring force and any given mass of weight (normally, it will be evident, the two weights should have the same mass), the length of the turned back end portions 32 and 34 of the cover (which end portions should normally be of the same length), which lie under the weights, will determine the violence of shock or height of drop necessary to trap one of the weights away from the end of the cavity. In other words, the device can be made to register any predetermined shock value which has been exceeded by appropriate selection of weights, spring and the length of the turned back end portions of the cover.

The two factors of violence of shock and height of drop are both believed to be normally involved in damage to the fragile contents of a package, since damage only occurs when the acceleration is high and when the acceleration continues long enough to compress and render ineffective shock mounting frequently found inside the package.

In the embodiment shown in the drawings, the housing is equipped with two ears 36 and 38 suitable for nailing it to the package. Obviously, the device can be secured to the package by any other appropriate means. If desired, a gummed label 40 can be employed to seal the device in place, making it tamperproof, and calling attention to its function and the indication to be expected. For example, the weights can be painted red and the gummed label could bear a legend, such as "Reject this package if red shows here," with an arrow pointing to the appropriate part of the shock registering device.

Rather than using a device having two weights and a spring therebetween, it will be evident that alternative constructions can be employed.

The present device for objectively registering shocks violent enough to be dangerous to the contents of a package has the additional advantages of being relatively simple and economical to manufacture. Because of its relatively low cost of manufacture, it will, in many instances, not be necessary to later remove the device for re-use. However, it does have the further advantage that it can be re-used repeatedly without impairment of function. This is true even if it has been applied to a package which has received an excessive shock. In such a case, all that is necessary is to remove the cover portion and thus permit the spring to return the displaced weight to its original position. The cover is then reinserted under the weights and spring and the device is ready for further service.

I claim:

1. A shock registering device for use with a package to determine when said package has been subjected to a shock caused by acceleration of greater than a predetermined value comprising a weight, resilient means biasing said weight for movement in one direction, a stop against which the weight is biased, means for mounting said weight on a package for movement in the opposite direction into a single indicating position upon said package receiving a shock greater than the predetermined value and means for holding said weight in said indicating position upon movement of said weight thereto.

2. A shock registering device for use with a package comprising a pair of weights, a spring engaged therebetween biasing said weights for movement in opposite directions, said spring also serving to permit one weight to move in the direction of the other weight into an indicating position upon said package receiving a shock greater than a predetermined value, and means for holding said weight in said indicating position upon movement of said weight thereto.

3. A shock registering device for use with a package comprising a housing, said housing defining a cavity, a pair of weights fitted movably within said cavity, a spring within said cavity and engaged between said weights, said spring urging the weights toward opposite ends of the housing defining said cavity, and a cover for holding the weights and spring within said cavity, said spring also serving to permit one weight to move in the direction of the end closer to the other weight into an indicating position upon said package receiving a shock greater than a predetermined value and means for holding said weight in said indicating position upon movement of said weight thereto, said means for holding the weight in indicating position comprising the ends of the cover, said ends, when in non-indicating position, being folded back on themselves, one end of the cover being under each weight to provide a pair of spring catches.

4. A shock registering device for use with a package to determine when said package has been submitted to a shock greater than a predetermined value comprising a housing, a weight slidably mounted in said housing, resilient means normally biasing said weight into a limiting position in said housing and means for retaining said weight in an indicating position to which said weight may be moved as a result of a shock greater than a predetermined value, said retaining means comprising a member normally in sliding engagement with said weight biased to move into an abutting engagement with said weight to hold said weight in said indicating position.

5. A device according to claim 4 wherein said retaining means comprises spring catch means normally positioned beneath said weight and biased to move into an abutting engagement between the side of said weight and said housing to hold said weight in said indicating position.

References Cited in the file of this patent

UNITED STATES PATENTS

| 2,157,514 | Whipple | May 9, 1939 |
| 2,543,722 | Hetzel | Feb. 27, 1951 |
| 2,673,464 | Zublin | Mar. 30, 1954 |

FOREIGN PATENTS

| 1,046,955 | France | July 15, 1953 |
| 705,745 | Great Britain | Mar. 17, 1954 |